US010325109B2

(12) United States Patent
Gomez Claros et al.

(10) Patent No.: US 10,325,109 B2
(45) Date of Patent: Jun. 18, 2019

(54) AUTOMATIC AND DYNAMIC SELECTION OF CRYPTOGRAPHIC MODULES FOR DIFFERENT SECURITY CONTEXTS WITHIN A COMPUTER NETWORK

(71) Applicant: INTERNATIONAL BUSINESS MACHINES CORPORATION, Armonk, NY (US)

(72) Inventors: Jose M. Gomez Claros, Emeryville, CA (US); Alan W. McLachlan, San Francisco, CA (US); Andrew R. Schmidt, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/704,082

(22) Filed: Sep. 14, 2017

(65) Prior Publication Data
US 2019/0080108 A1 Mar. 14, 2019

(51) Int. Cl.
*G06F 21/00* (2013.01)
*G06F 21/62* (2013.01)
(Continued)

(52) U.S. Cl.
CPC .......... *G06F 21/6218* (2013.01); *G06F 16/27* (2019.01); *G06F 21/31* (2013.01);
(Continued)

(58) Field of Classification Search
CPC ........... G03G 21/1892; G03G 15/0863; G03G 15/5079; G03G 21/1889; H04L 9/3247;
(Continued)

(56) References Cited

U.S. PATENT DOCUMENTS

| 3,798,359 A | * | 3/1974 | Feistel | ................. H04L 9/0618 380/37 |
| 6,038,551 A | | 3/2000 | Barlow et al. | |
| | | | (Continued) | |

OTHER PUBLICATIONS

Gomez Claros et al., "Automatic and Dynamic Selection of Cryptographic Modules for Different Security Contexts Within a Computer Network", U.S. Appl. No. 15/854,175, filed Dec. 26, 2017.
(Continued)

*Primary Examiner* — Don G Zhao
(74) *Attorney, Agent, or Firm* — Anthony M. Pallone

(57) ABSTRACT

An embodiment of the invention may include a method, computer program product, and system for securing data. The embodiment may include receiving, by a management program, identification of a selected cryptographic security module. The selected cryptographic security module is graphically selected by an authorized operator via a graphic user interface. The selected cryptographic security module contains unique individual symbols that contain references to functions and is selected from a plurality of mutually exclusive cryptographic security modules. Based on the received identification of the selected cryptographic security module, the embodiment may include generating, by the management program, a global configuration file. The embodiment may include transmitting, by the management program, a notification to an agent program on a client computer. The notification informs the agent program of the generated global configuration file and directs the agent program to enforce the selected cryptographic security module on the client computer.

17 Claims, 5 Drawing Sheets

(51) Int. Cl.
*G06F 21/31* (2013.01)
*G06F 21/44* (2013.01)
*G06Q 20/10* (2012.01)
*G06F 21/55* (2013.01)
*G06F 16/27* (2019.01)

(52) U.S. Cl.
CPC .............. *G06F 21/44* (2013.01); *G06F 21/55* (2013.01); *G06Q 20/105* (2013.01); *H04L 2209/805* (2013.01); *H04L 2463/082* (2013.01)

(58) Field of Classification Search
CPC ............... H04L 63/08; H04L 2209/127; H04L 2209/805; H04L 2463/082; H04L 9/00; B41J 2/17546; G06F 21/6218; G06F 21/602; G06F 21/31; G06F 21/44; G06F 21/55; G06F 21/71; G06F 2221/2153; G06Q 20/105
See application file for complete search history.

(56) References Cited

U.S. PATENT DOCUMENTS

| | | | |
|---|---|---|---|
| 6,732,275 B1* | 5/2004 | Dimenstein | G06F 21/6209 713/183 |
| 7,260,724 B1 | 8/2007 | Dickinson et al. | |
| 8,234,686 B2 | 7/2012 | Alvermann et al. | |
| 8,554,176 B2* | 10/2013 | McLean | G06F 21/602 455/410 |
| 8,725,852 B1* | 5/2014 | Boddu | H04L 61/2076 370/221 |
| 8,839,350 B1* | 9/2014 | McNair | H04L 63/20 726/1 |
| 8,898,793 B2* | 11/2014 | Miettinen | G06F 21/31 380/258 |
| 9,021,267 B2* | 4/2015 | Neumann | H04L 9/3247 713/156 |
| 9,104,889 B1* | 8/2015 | Kiswani | G06F 21/6218 |
| 9,197,616 B2* | 11/2015 | Sinha | H04L 63/06 |
| 9,613,224 B2 | 4/2017 | Wang et al. | |
| 9,681,293 B2* | 6/2017 | Schwager | H04L 9/0861 |
| 9,817,990 B2* | 11/2017 | Lee | G06F 21/6218 |
| 2002/0002476 A1* | 1/2002 | Mitsuoka | G06Q 10/063112 705/7.14 |
| 2004/0230661 A1* | 11/2004 | Rashid | H04L 51/24 709/207 |
| 2006/0269053 A1* | 11/2006 | Miyazawa | G06F 21/606 380/28 |
| 2008/0034424 A1 | 2/2008 | Overcash et al. | |
| 2009/0129586 A1* | 5/2009 | Miyazaki | H04L 9/00 380/28 |
| 2009/0138699 A1* | 5/2009 | Miyazaki | G06F 21/57 713/150 |
| 2010/0281270 A1* | 11/2010 | Miyazaki | G06F 21/602 713/189 |
| 2013/0047196 A1* | 2/2013 | Gong | G06F 21/6227 726/1 |
| 2013/0198863 A1* | 8/2013 | Wallin | G06F 21/10 726/28 |
| 2014/0368601 A1* | 12/2014 | deCharms | H04W 4/021 348/14.02 |
| 2015/0222646 A1* | 8/2015 | Diehl | H04L 63/1416 726/23 |
| 2015/0339788 A1* | 11/2015 | Dawson | G06F 21/6227 705/311 |
| 2015/0350172 A1* | 12/2015 | Kiswani | G06F 21/6218 713/171 |
| 2015/0382190 A1 | 12/2015 | Canoy et al. | |
| 2016/0072784 A1* | 3/2016 | Liang | H04L 63/0892 726/4 |
| 2016/0219077 A1* | 7/2016 | Pandya | H04L 63/20 |
| 2017/0126740 A1* | 5/2017 | Bejarano Ardila | H04L 63/20 |
| 2017/0142162 A1* | 5/2017 | Zhang | H04L 63/205 |
| 2017/0200122 A1* | 7/2017 | Edson | G06Q 10/101 |
| 2017/0351879 A1* | 12/2017 | Sion | G06F 21/606 |
| 2017/0371932 A1* | 12/2017 | Chamarajnagar | G06F 17/30516 |
| 2018/0026953 A1* | 1/2018 | Kiswani | G06F 21/6218 713/171 |
| 2018/0027006 A1* | 1/2018 | Zimmermann | H04L 63/0245 726/11 |
| 2018/0107608 A1* | 4/2018 | Kaplan | G06F 12/1466 |

OTHER PUBLICATIONS

List of IBM Patents or Patent Applications to be Treated as Related. Filed Dec. 26, 2017, 2 pages.

Mell et al., "The NIST Definition of Cloud Computing", NIST, Sep. 2011, 7 Pages, Special Publication 800-145, U.S. Department of Commerce, Gaithersburg, MD.

IBM, "IBM BigFix 9.5.5 Release Notes", Printed on Sep. 11, 2017, 3 Pages, http://www.Ibm.com/developerworks/community/wikis/home?lang=en, Disclosed in software on Mar. 28, 2017, Grace Period Disclosure.

* cited by examiner

AUTOMATIC AND DYNAMIC SELECTION OF CRYPTOGRAPHIC MODULES FOR DIFFERENT SECURITY CONTEXTS WITHIN A COMPUTER NETWORK

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM BigFix® Platform 9.5.5, made available to the public on Mar. 28, 2017.

BACKGROUND

The present invention relates, generally, to the field of cyber security, and more specifically, to implementing cryptographic security modules within a computer network.

Information security uses cryptography to transform usable information into a form that renders it unusable by anyone other than an authorized user. This process is known as encryption. Information that has been encrypted can be transformed back into its original usable form by an authorized user who possesses the cryptographic key. This process is known as decryption. Cryptography is used in computer information security to protect electronic information from unauthorized or accidental disclosure while the information is in transit and while information is in storage.

BRIEF SUMMARY

An embodiment of the invention may include a method, computer program product, and system for securing data. The embodiment may include receiving, by a management program, identification of a selected cryptographic security module. The selected cryptographic security module is graphically selected by an authorized operator via a graphic user interface. The selected cryptographic security module contains unique individual symbols that contain references to functions within the selected cryptographic security module. The selected cryptographic security module is selected from a plurality of mutually exclusive cryptographic security modules. Based on the received identification of the selected cryptographic security module, the embodiment may include generating, by the management program, a global configuration file. The embodiment may include transmitting, by the management program, a notification to an agent program on a client computer. The notification informs the agent program of the generated global configuration file stored in the database. The notification directs the agent program to enforce the selected cryptographic security module on the client computer.

DETAILED DESCRIPTION

Figure 1:
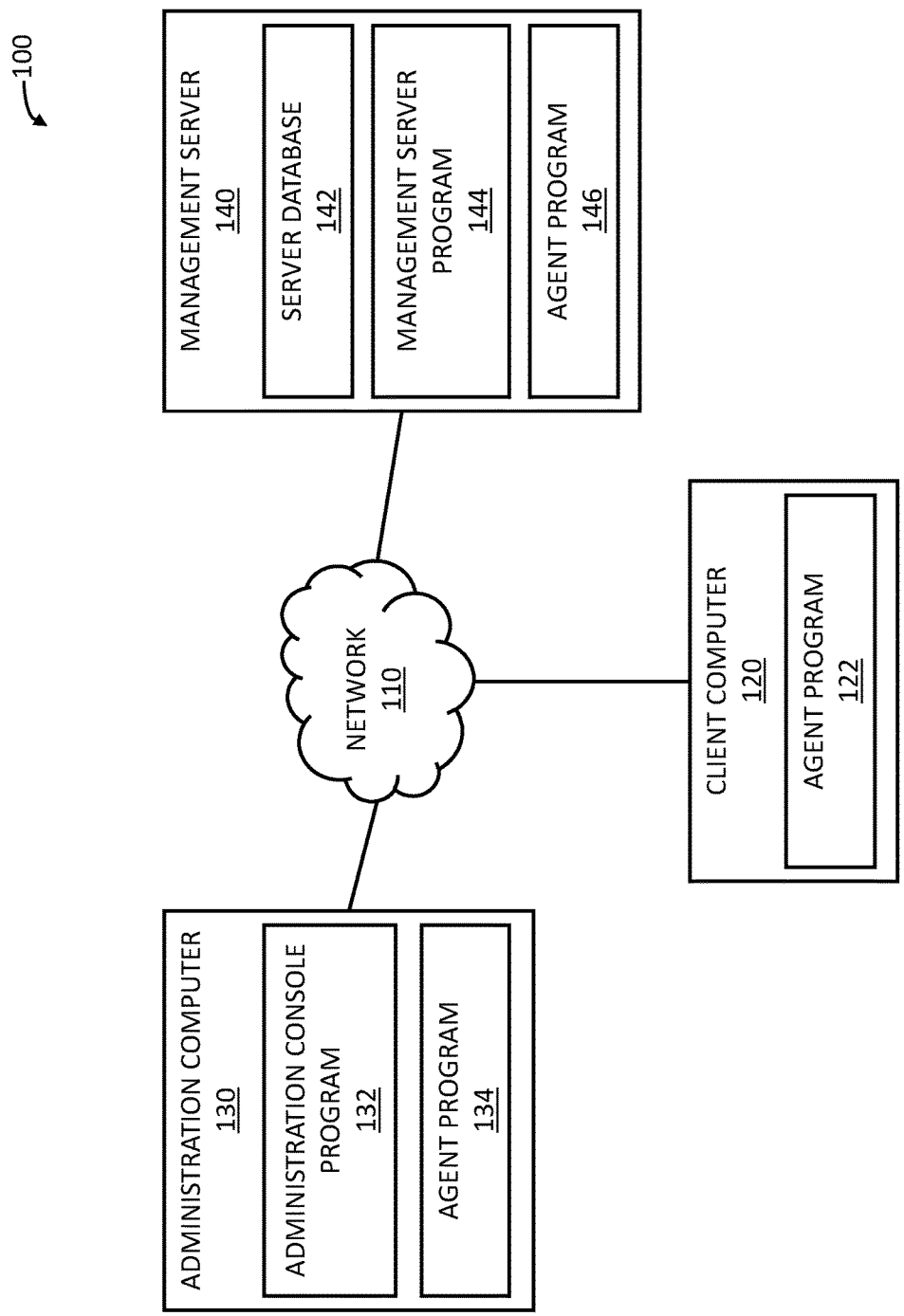
FIG. 1 is a block diagram illustrating a cryptographic security policy management system, in accordance with an embodiment of the present invention.

Software programs often utilize code implementing cryptography though a dynamically loaded, shared object module. An advantage of a shared cryptographic module is that it can enforce a particular cryptographic security policy for a suite of software with a common purpose. This includes, but is not limited to, the cryptographic component of various methods to secure network communications. However, different security contexts can require different security policies which may be mutually exclusive and require a different cryptographic module to implement each security policy. This can be true when considering the security threats faced by different computer networks with differing security policies based on what is determined to be the most important threat to mitigate for that particular network. Furthermore, another problem with networked computers arises in the need to ensure that all networked computers maintain the same security policy that the network security context requires. This may be accomplished by ensuring that the software on every networked computer utilizes the specific cryptographic module required to implement the desired network security policy. The cryptographic module must be provided independently of any similar module provided by the networked computer operating system or execution environment for three reasons: 1) to be certain of the detailed implementation of the cryptographic functionality by ensuring that the cryptographic module used does not contain security vulnerabilities resulting from unintentional/intentional defects in the software implementation (i.e. bugs/backdoors), or obsolete cryptographic protocols or algorithms; 2) the cryptographic module of the underlying operating system or execution environment cannot implement the desired network security policy; and 3) to ensure a consistent cryptography implementation across heterogeneous networks with a variety of operating systems and execution environments.

An example of mutually exclusive security policies is as follows. The Federal Information Processing Standard (FIPS) 140-2 has prioritized the need to mitigate against the threat of modification of the binary executable code for cryptographic modules in persistent storage, or modification during loading into process memory space from persistent storage. Therefore, as part of the initialization process, FIPS 140-2 compliance requires the cryptographic module to calculate a keyed-hash message authenticate code (HMAC) of the binary executable image after it is loaded into process space and before any cryptographic routines are executed. This calculated HMAC is then compared against a securely stored pre-computed value to validate the module's binary code integrity. The repeatability of this hashing process requires that the cryptographic module be loaded at the same address in process space every time. That is, a FIPS capable cryptographic module must be built with a fixed base address where it must always be loaded. However, in other network security contexts the threat of in-process malicious code execution has been prioritized as the greatest threat to mitigate. In such contexts, always loading the cryptographic module into the same address is a severe vulnerability since malicious code can easily find and tamper with the cryptographic module, for instance weakening cryptographic algorithms or divulging private keys. In this case, the mitigating security policy is to require the cryptographic module to be loaded into a random memory address in process space; a different address every time the module is loaded. This technique is well known as Address Space Layout Randomization (ASLR). Thus, FIPS 140-2 compliance and ASLR are mutually exclusive security policies requiring a different cryptographic module to be built to satisfy each policy.

The IBM BigFix® Endpoint Manager provides a centralized and automated way to securely manage and ensure that all the computers within a network follow the desired network security policy. Its core functionality is described in IBM BigFix® documentation and covered by several United States patents. BigFix® Platform versions 8.2.1310.0 through the final release of 9.0 had the ability to load different cryptographic security modules depending on whether FIPS 140-2 compliance was required or not. This was implemented through a switching mechanism whereby BigFix® managed networks requiring FIPS 140-2 compliance would load a custom FIPS 140-2 validated OpenSSL cryptographic module, and those networks that didn't would load a revised version containing the most recent OpenSSL cryptographic module. Whether or not FIPS 140-2 compliance is required is determined by a global configuration file, called the masthead, that a central BigFix® server automatically pushes out to all the computers on the network. This configuration file is digitally signed by the central BigFix® server preventing its unauthorized modification and ensuring that the network security policies it contains are defined by master operators with the appropriate authority. However, this implementation lacks the ability to select and enforce one of multiple mutually exclusive cryptographic security policies, specifically, it could not select between FIPS 140-2 and ASLR capable cryptographic security modules. With OpenSSL, FIPS 140-2 mode is entered by calling a function that performs the FIPS 140-2 self-tests to validate the cryptographic module and then disables the cryptographic functionality which is not FIPS 140-2 compliant. The non-FIPS 140-2 module maintained all the code necessary to enter FIPS 140-2 mode and disable non-FIPS compliant functionality, however FIPS 140-2 operation could not be claimed because the cryptographic modules were not officially validated by the National Institute of Standards and Technology (NIST) Cryptographic Module Validation Program (CMVP) testing. Significantly, both the FIPS 140-2 and non-FIPS 140-2 modules had to be loaded into process memory at the same fixed base address. Consequently, the non-FIPS 140-2 module was not capable of ASLR making it vulnerable to a certain class of in process malicious code execution that in some network contexts are the largest security threat. Both modules contained the same symbols, thus there was no need to only load certain symbols depending on which module is loaded.

In BigFix® Platform versions 9.1 through 9.5.4, the FIPS 140-2/non-FIPS 140-2 switching mechanism was retained, but the nominally FIPS 140-2/non-FIPS 140-2 cryptographic modules are in fact identical binary copies of each other; there is no difference between the modules. This is because these versions of the BigFix® Platform utilizes a newer branch of OpenSSL which has a separate FIPS 140-2 certification, thereby removing the need for a custom BigFix® specific FIPS 140-2 validation.

Embodiments of the present invention relax the requirement that the non-FIPS 140-2 cryptographic module still contain the code for FIPS 140-2 operation, and relax the requirement that the non-FIPS 140-2 cryptographic module be built with the FIPS 140-2 build process, whether officially validated or not. Before, the choice of cryptographic modules was limited to two (FIPS 140-2 validated, or non FIPS 140-2 validated) and both modules needed to be built with a fixed base address. Now that this is relaxed, embodiments of the present invention create the ability to have an arbitrary number of cryptographic modules, each built differently to support potentially mutually exclusive network security policies and the choice of which module to use is securely and automatically enforced while being selectable at any time from a remote, central location only by operators with the correct authorization and authority. Significantly, this enables the selection of a cryptographic module that is FIPS 140-2 validated or a cryptographic module that supports ASLR, which are mutually exclusive cryptographic security policies.

Embodiments of the present invention may include a cryptographic security policy management ("CSPM") system 100, described below, which provides a method for automatically and dynamically selecting cryptographic security modules for different security contexts in computers across an entire network. Cryptographic security policy management system 100 may receive a selection for a cryptographic security module to be enforced across a network. The selection may originate from an authorized operator of an administration computer on the network and be transmitted to a management server on the network. Cryptographic security policy management system 100 may then generate, via the management server, a digitally signed global configuration file specifying the selected cryptographic security module. The global configuration file may be distributed to agent programs of CSPM system 100, located on every computer in the network, which may enforce the selected cryptographic security module on the respective networked computers.

Embodiments of the present invention will now be described in detail with reference to the accompanying Figures.

FIG. 1 is a functional block diagram illustrating cryptographic security policy management system 100, in accordance with an embodiment of the present invention. In an example embodiment, cryptographic security policy management system 100 may include network 110, client computer 120, administrative computer 130, and management server 140.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between client computer 120, administration computer 130, and management server 140.

In an example embodiment, client computer 120 may include agent program 122. Client computer 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as administration computer 130 and management server 140, via network 110, and capable of supporting the functionality required of embodiments of the invention. While client computer 120 is shown as a single device, in other embodiments, client computer 120 may be comprised of a cluster or plurality of computing devices, working together or working separately. Client computer 120 may be described generally with respect to FIG. 3 below.

In an example embodiment, agent program 122 may be a program, or subroutine contained in a program, that may operate to enforce a cryptographic security policy. A selected cryptographic security policy may be automatically enforced by the way an agent program (e.g., agent program 122, agent program 134, and agent program 146) reads a global configuration file and verifies the digital signature on the global configuration file. On agent program start up, an agent program (e.g., agent program 122, agent program 134, and agent program 146) parses the global configuration file, validates the signature, and configures itself according to the settings in the global configuration file. An agent program may not run without a signed global configuration file being present, in fact, it may stop when it fails to find the file. If an agent program (e.g., agent program 122, agent program 134, and agent program 146) cannot validate the signature in the global configuration file, it may write an error message to a log file and stop execution. When the cryptography setting specifying which cryptographic module to use in the global configuration file changes, the agent program may restart itself. An agent program may only load the new cryptography module and resume normal operation if it can verify the signature on the global configuration file. Only an operator with access to the private key with a certificate that has been signed in the correct certificate chain can sign a global configuration file that an agent program may validate. This prevents unauthorized operators from attempting to change the cryptographic security module that an agent program enforces. In an example embodiment, agent program 122 may receive notification of an updated global configuration file and direction to update the local file system with the updated global configuration file. Consequently, agent program 122 may then request the updated global configuration file, save it to the local file system on client computer 120, and load the cryptographic security module specified in the received global configuration file. In an example embodiment, agent program 122 receives notification, from management server program 144, of an updated global configuration file. In an example embodiment, agent program 122 also receives direction, from management server program 144, to save the updated global configuration file to the local file system on client computer 120. Furthermore, in an example embodiment, agent program 122 loads the cryptographic security module specified in the updated global configuration file on client computer 120.

In an example embodiment, administration computer 130 may include administration console program 132 and agent program 134. Administration computer 130 may be a desktop computer, a notebook, a laptop computer, a networked computer appliance, a virtual device, a thin client, or any other networked electronic device or computing system capable of receiving and sending data from and to other computing devices such as client computer 120 and management server 140, via network 110, and capable of supporting the functionality required of embodiments of the invention. While administration computer 130 is shown as a single device, in other embodiments, administration computer 130 may be comprised of a cluster or plurality of computing devices, working together or working separately. Administration computer 130 may be described generally with respect to FIG. 3 below.

In an example embodiment, administration console program 132 may be a program, or subroutine contained in a program, that may allow an authenticated and authorized operator of administration computer 130 to graphically select one out of many possible mutually exclusive cryptographic security policies. One way in which operators may be authenticated and authorized may be through the use of Windows session credentials. Administration console program 132 may also securely send and receive, via network 110, information concerning the selected cryptographic security policy to and from management server program 144 located on management server 140. In addition, administration console program 132 may be connectively coupled to hardware components, such as those depicted by FIG. 3, for receiving user input, including mice, keyboards, touchscreens, microphones, cameras, and the like. In an example embodiment, administration console program 132 may be implemented via a web browsing application containing a graphical user interface (GUI) and display, located on administration computer 130, that is capable of transferring data files, folders, audio, video, hyperlinks, compressed data, and other forms of data transfer individually or in bulk. The GUI may present selection options for different cryptographic security modules to the authenticated and authorized operator though, for example, radio buttons, combo boxes, list boxes, drop down menus, or the like, so long as the presentation enforces the selection of only one module. In an example embodiment, administration console program 132 may receive input from an authenticated and authorized operator indicating the selection of a single cryptographic security module, from a list of mutually exclusive cryptographic security modules, and securely transmit, via network 110, identification of the selection (e.g. FIPS 140-2) to management server program 144.

In other embodiments, administration console program 132 may be implemented via other integrated or standalone software applications and hardware capable of receiving user interaction and communicating with other electronic devices. In yet other embodiments, administration console program 132 may be implemented via a command line interface (CLI) which may allow, with a single command from a command prompt, an authenticated and authorized operator to select one of the multiple mutually exclusive cryptographic security modules. Furthermore, in an embodiment where administration console program 132 is implemented via a CLI, the selection of a cryptographic security module may be passed as an argument to administration console program 132, which may then automatically and securely transmit, via network 110, identification of the selection to management server program 144. This may allow an external computer program to set the cryptographic security module according to any network policy. For example, operating system task scheduling facilities may be utilized to execute the CLI implementation of administration console program 132 with command line arguments to select different cryptographic security modules at different times.

In an example embodiment, agent program 134 may be a program, or subroutine contained in a program, that may operate to enforce a cryptographic security policy. Agent program 134 may receive notification of an updated global configuration file and direction to update the local file system with the updated global configuration file. Consequently, agent program 134 may then request the updated global configuration file, save it to the local file system on administration computer 130, and load the cryptographic security module specified in the received global configuration file. In an example embodiment, agent program 134 receives notification, from management server program 144, of an updated global configuration file. In an example embodiment, agent program 134 also receives direction, from management server program 144, to save the updated global configuration file to the local file system on administration computer 130. Furthermore, in an example embodiment, agent program 134 loads the cryptographic security module specified in the updated global configuration file on administration computer 130.

In an example embodiment, management server 140 may include server database 142, management server program 144, and agent program 146. Management server 140 may be a desktop computer, a notebook, a laptop computer, a blade server, a networked computer appliance, a virtual device, a thin client, or any other networked electronic device or computing system capable of receiving and sending data from and to other computing devices such as client computer 120 and administration computer 130, via network 110, and capable of supporting the functionality required of embodiments of the invention. While management server 140 is shown as a single device, in other embodiments, management server 140 may be comprised of a cluster or plurality of computing devices, working together or working separately. Management server 140 may be described generally with respect to FIG. 3 below.

Server database 142 may be a database containing a digitally signed global configuration file created by management server program 144, described below. Server database 142 may also store multiple cryptographic security modules implementing mutually exclusive cryptographic policies. Furthermore, each cryptographic security module stored within server database 142 may include individual symbols, unique to each module, that contain the references to functions in a specified cryptographic security module which may be called by agent programs (e.g. agent program 122 and agent program 134). Additionally, server database 142 may contain plaintext data, ciphertext data, cryptographic keys, and operator authentication data, according to embodiments of the present invention. In an example embodiment, server database 142 is loaded with a digitally signed global configuration file.

Management server program 144 operates to distribute a cryptographic security policy, selected from multiple mutually exclusive cryptographic security policies, for enforcement on all computers within a network. In an example embodiment, management sever program 144 may be a program, or subroutine contained in a program that receives a cryptographic security module selection from administration console program 132. Management server program 144 may then generate a digitally signed global configuration file (a.k.a. the masthead), in the SMIME (secure/multipurpose internet mail extensions) format for digitally signed documents, which specifies the selected cryptographic security module to be enforced. Once generated, management server program 144 may load the masthead into server database 142. With the masthead loaded in server database 142, management server program 144 may, in an example embodiment, notify all agent programs (e.g. agent program 122, agent program 134, agent program 146) of the newly generated masthead and direct all agent programs to enforce the cryptographic security module specified in the masthead on their respective local machines within the network (e.g. client computer 120 and administration computer 130). The operations and functions of management server program 144 are described in further detail below with regard to FIG. 2.

In another embodiment, the digitally signed global configuration file may be generated and signed by administration console program 132. Administration console program 132 may then transmit the generated global configuration file to management server program 144 for insertion into server database 142. In an embodiment where administration console program 132 signs the global configuration file, the keys used by administration console program 132 may have a higher authority than any key used by management server program 144 to sign the global configuration file. Furthermore, in another embodiment, the global configuration file may be modified via the CLI implementation of administration console program 132.

In an example embodiment, agent program 146 may be a program, or subroutine contained in a program, that may operate to enforce a cryptographic security policy. Agent program 146 may receive notification of an updated global configuration file and direction to update the local file system with the updated global configuration file. Consequently, agent program 146 may then request the updated global configuration file, save it to the local file system on management server 140, and load the cryptographic security module specified in the received global configuration file. In an example embodiment, agent program 146 receives notification, from management server program 144, of an updated global configuration file. In an example embodiment, agent program 146 also receives direction, from management server program 144, to save the updated global configuration file to the local file system on management server 140. Furthermore, in an example embodiment, agent program 146 loads the cryptographic security module specified in the updated global configuration file on management server 140.

Figure 2:
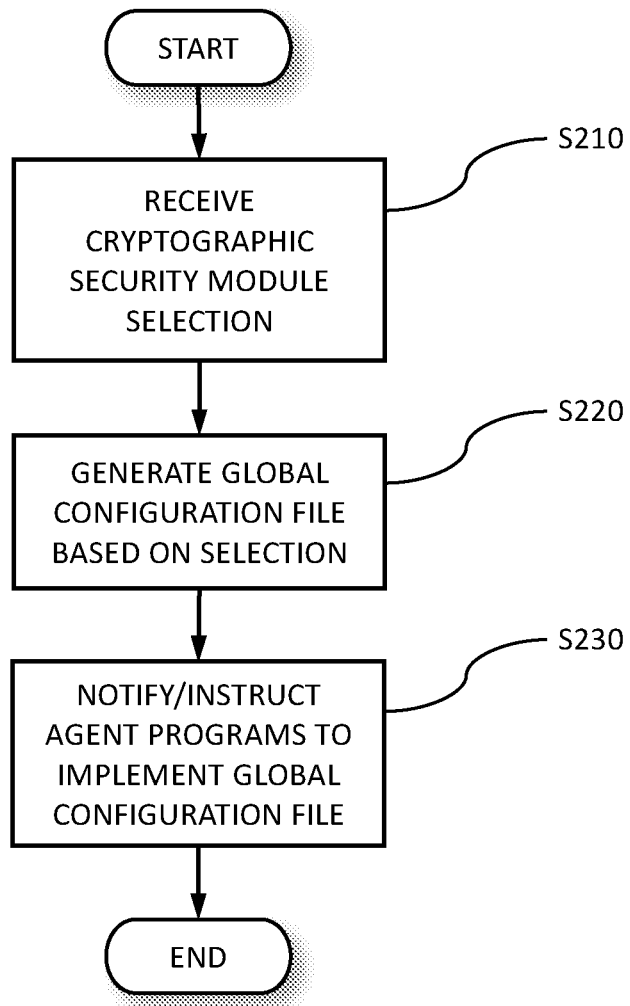
FIG. 2 is a flowchart illustrating the operations of the management server program of FIG. 1, in accordance with an embodiment of the invention.

FIG. 2 shows a flowchart illustrating the operations of management server program 144 in accordance with an example embodiment of the invention. Referring to step S210, management server program 144 may receive, via network 110, identification of a selected cryptographic security module from administration console program 132, located on administration computer 130. The received identification may result from an authenticated and authorized operator selecting, via administration console program 132, a single cryptographic security module from multiple options of mutually exclusive cryptographic security modules (e.g. FIPS 140-2, ASLR). The operator's selection may then be securely transmitted, via network 110, to management server program 144. In an example embodiment, management server program 144 receives notification from administration console program 132 which identifies FIPS 140-2 as the cryptographic security module selected by an authenticated and authorized operator utilizing administration console program 132.

Referring to step S220, management server program 144 may, in response to the identification received in step S210, automatically generate a digitally signed global configuration file using an appropriately secured private key and load the generated file into a database (e.g. server database 142). The generated file may be optionally encrypted. In an example embodiment, the generated global configuration file may contain a field to set one of multiple mutually exclusive cryptographic security policies (e.g. FIPS 140-2, ASLR) to be enforced on a client computer (e.g. client computer 120). The generated global configuration file may combine security module configuration information and license information along with a public key used to verify digital signatures. Additionally, the generated global configuration file may be used by agent programs located on client computers (e.g. agent program 122 located on client computer 120) to locate and securely communicate to management server program 144 located on management server 140. In an example embodiment, management server program 144 generates a global configuration file with FIPS 140-2 specified in the cryptographic security policy field based on the identification received in step S210. Furthermore, in an example embodiment, management server program 144 may load the generated global configuration file into server database 142.

Referring to step S230, management server program 144 may, upon loading the generated global configuration file into server database 142, automatically notify agent programs (e.g. agent program 122, agent program 134, and ag) running locally on networked computers (e.g. client computer 120, administration computer 130) of the generated global configuration file, loaded in server database 142, and instruct the agent programs to enforce the cryptographic security module specified in the configuration file generated in step S220. The notification to the agent programs may be implemented via a user datagram protocol (UDP) message. In an example embodiment, management server program 144 notifies agent program 122 of the generated global configuration file stored in server database 142 and instructs agent program 122 to enforce, on client computer 120, the cryptographic security module specified in the configuration file. As a result of this notification/instruction from management server program 144, agent program 122 may retrieve the generated global configuration file from server database 142 and save it to the local file system of client computer 120. Agent program 122 may ensure that the digital signature in the retrieved global configuration file is verified by a trusted certificate chain. Once the global configuration file is verified, agent program 122 may parse the fields in the configuration file that specify the cryptographic security module to enforce and restart itself to implement the specified cryptographic security module, as instructed by management server program 144. In doing so, agent program 122 may load, from server database 142, the specified cryptographic module which may also include loading all the individual symbols that contain the references to functions in the specified cryptographic module that agent program 122 may call. Different symbols may be required depending on which cryptographic security module is selected. In an example embodiment, agent program 122 may execute conditional logic (i.e., programming code) to load only the symbols that are in the cryptographic security module specified by the global configuration file generated in step S220. This may ensure that each mutually exclusive cryptographic security module stored in server database 142 utilizes their own unique symbols and consequently implements distinct functionalities.

Figure 3:
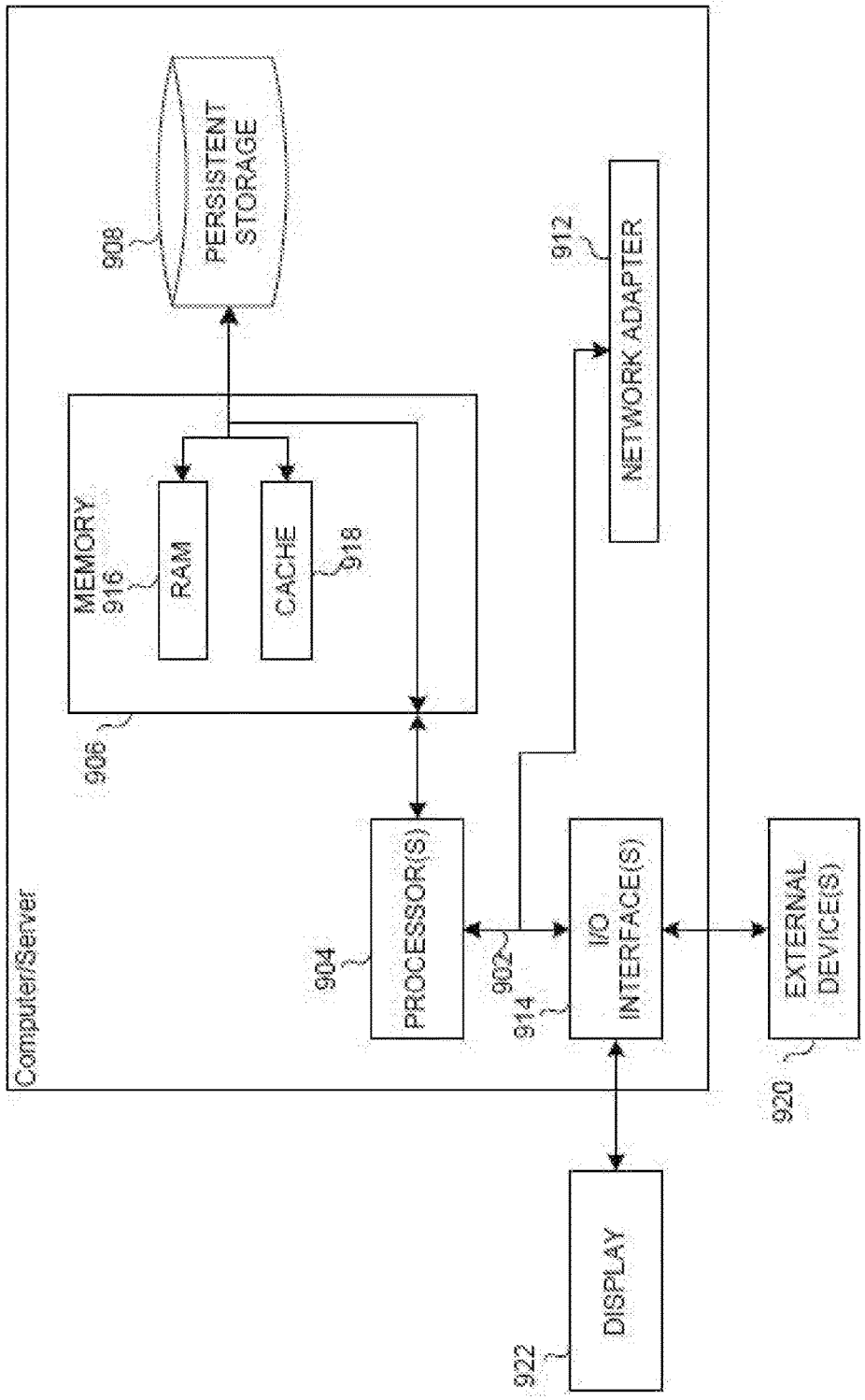
FIG. 3 is a block diagram depicting the hardware components of the cryptographic security policy management system of FIG. 1, in accordance with an embodiment of the invention.

FIG. 3 depicts a block diagram of components of client computer 120, administration computer 130, and management server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client computer 120, administration computer 130, and management server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs agent program 122 in client computer 120; administration console program 132 and agent program 134 in administration computer 130; and server database 142, management server program 144, and agent program 146 in management server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs agent program 122 in client computer 120; administration console program 132 and agent program 134 in administration computer 130; and server database 142, management server program 144, and agent program 146 in management server 140 may be downloaded to persistent storage 908 through network adapter 912.

I/O interface(s) 914 allows for input and output of data with other devices that may be connected to Client computer 120, administration computer 130, and management server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs agent program 122 in client computer 120; administration console program 132 and agent program 134 in administration computer 130; and server database 142, management server program 144, and agent program 146 in management server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
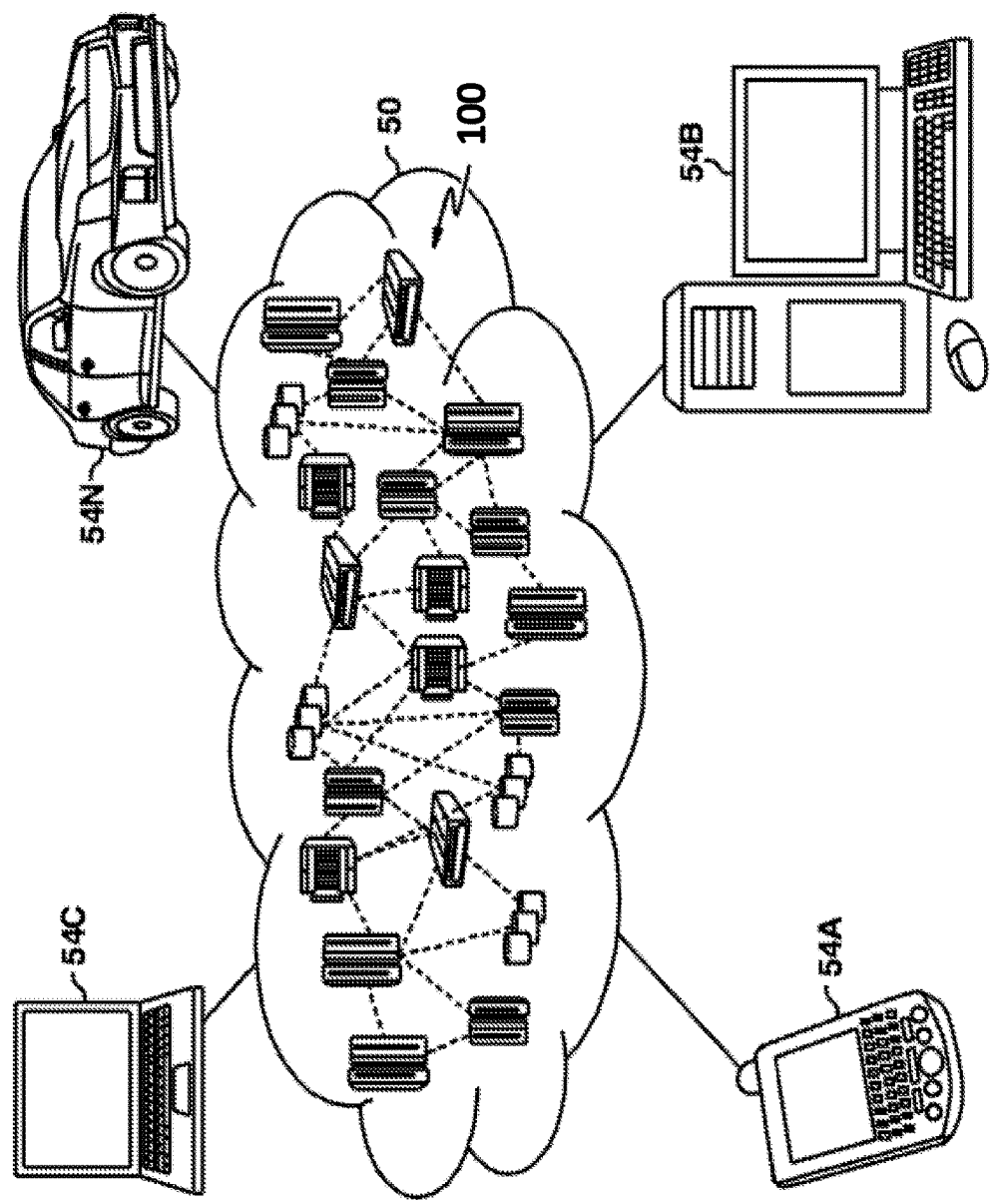
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
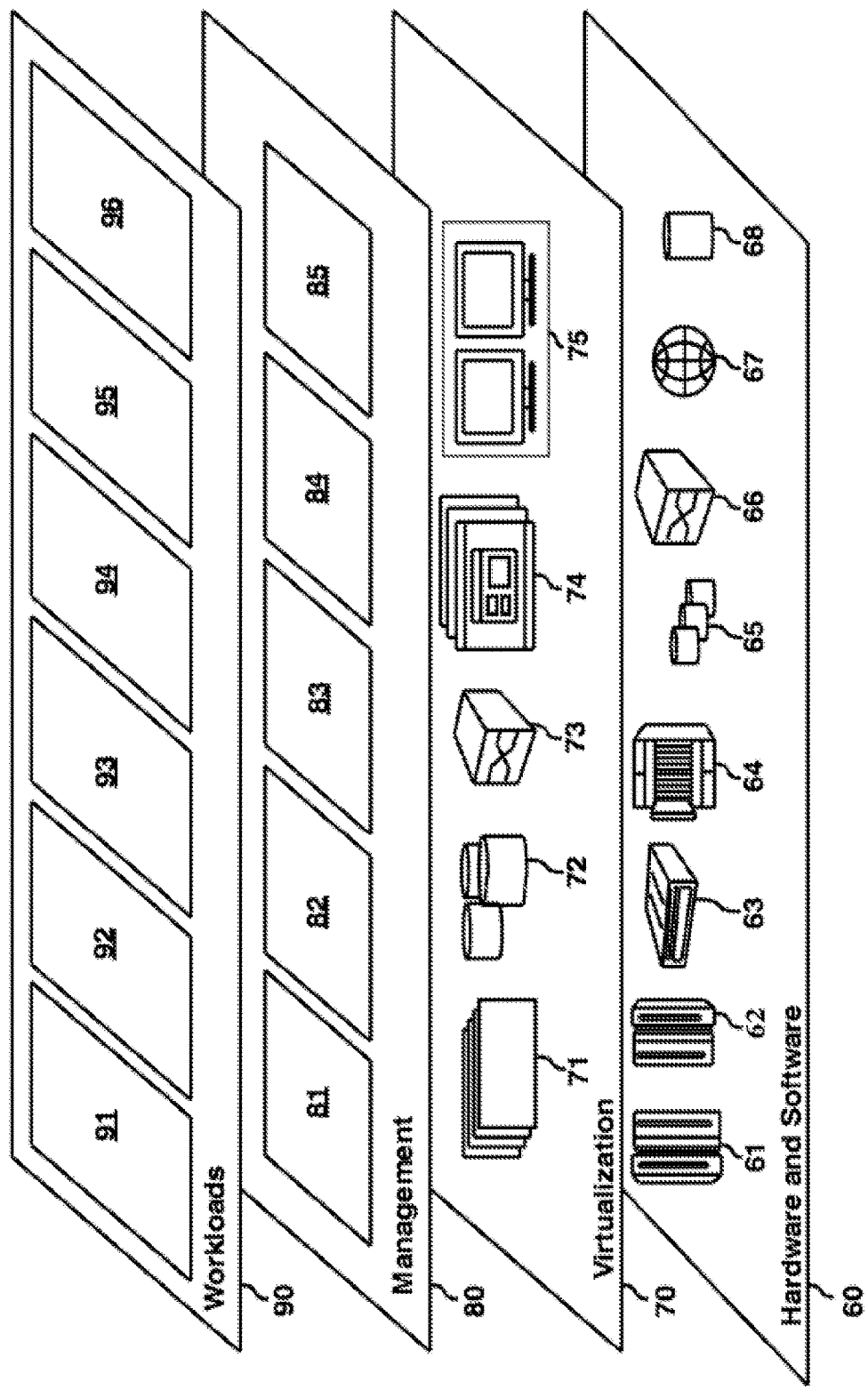
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptographic security policy management system 96. Cryptographic security policy management system 96 may relate to security management within a computer network environment.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for securing data, the method comprising:
   receiving, by a management program, identification of a selected cryptographic security module, wherein the selected cryptographic security module is graphically selected by an authorized operator via a graphic user interface, and wherein the selected cryptographic security module contains unique individual symbols that contain references to functions within the selected cryptographic security module, and wherein the selected cryptographic security module is selected from a plurality of mutually exclusive cryptographic security modules;
   based on the received identification of the selected cryptographic security module, generating, by the management program, a global configuration file, wherein the global configuration file comprises a field specifying the selected cryptographic security module, and wherein the global configuration file is digitally signed, by the management program, using a private key with a certificate that has been signed in a correct certificate chain, and wherein the global configuration file is in secure/multipurpose internet mail extensions format for digitally signed documents; and
   transmitting, by the management program, a notification to an agent program on a client computer, wherein the notification informs the agent program of the generated global configuration file stored in the database, and wherein the notification directs the agent program to enforce the selected cryptographic security module on the client computer.

2. The method of claim 1, wherein selection and identification of the selected cryptographic security module may be passed as a command line argument within a command line interface.

3. The method of claim 1, wherein enforcing the selected cryptographic security module comprises:
   downloading the generated global configuration file to a local file system on the client computer;
   validating the generated global configuration file via a trusted certificate chain; and
   loading the selected cryptographic security module on the client computer.

4. The method of claim 3, wherein loading the selected cryptographic security module includes loading the unique individual symbols that contain references to functions within the selected cryptographic security module.

5. The method of claim 1, wherein the notification is implemented via a user datagram protocol message.

6. The method of claim 1, wherein the global configuration file is stored within a database, and wherein the database contains the plurality of mutually exclusive cryptographic security modules.

7. A computer program product for securing data, the computer program product comprising:
   one or more computer-readable tangible storage devices and program instructions stored on at least one of the one or more tangible storage devices, the program instructions comprising:
   program instructions to receive, by a management program, identification of a selected cryptographic security module, wherein the selected cryptographic security module is graphically selected by an authorized operator via a graphic user interface, and wherein the selected cryptographic security module contains unique individual symbols that contain references to functions within the selected cryptographic security module, and wherein the selected cryptographic security module is selected from a plurality of mutually exclusive cryptographic security modules;
   based on the received identification of the selected cryptographic security module, program instructions to generate, by the management program, a global configuration file, wherein the global configuration file comprises a field specifying the selected cryptographic security module, and wherein the global configuration file is digitally signed, by the management program, using a private key with a certificate that has been signed in a correct certificate chain, and wherein the global configuration file is in secure/multipurpose internet mail extensions format for digitally signed documents; and program instructions to transmit, by the management program, a notification to an agent program on a client computer, wherein the notification informs the agent program of the generated global configuration file stored in the database, and wherein the notification directs the agent program to enforce the selected cryptographic security module on the client computer.

8. The computer program product of claim 7, wherein selection and identification of the selected cryptographic security module may be passed as a command line argument within a command line interface.

9. The computer program product of claim 7, wherein enforcing the selected cryptographic security module comprises:

program instructions to download the generated global configuration file to a local file system on the client computer;

program instructions to validate the generated global configuration file via a trusted certificate chain; and program instructions to load the selected cryptographic security module on the client computer.

10. The computer program product of claim 9, wherein program instructions to load the selected cryptographic security module include loading the unique individual symbols that contain references to functions within the selected cryptographic security module.

11. The computer program product of claim 7, wherein the notification is implemented via a user datagram protocol message.

12. The computer program product of claim 7, wherein the global configuration file is stored within a database, and wherein the database contains the plurality of mutually exclusive cryptographic security modules.

13. A computer system for securing data, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive, by a management program, identification of a selected cryptographic security module, wherein the selected cryptographic security module is graphically selected by an authorized operator via a graphic user interface, and wherein the selected cryptographic security module contains unique individual symbols that contain references to functions within the selected cryptographic security module, and wherein the selected cryptographic security module is selected from a plurality of mutually exclusive cryptographic security modules;

based on the received identification of the selected cryptographic security module, program instructions to generate, by the management program, a global configuration file, wherein the global configuration file comprises a field specifying the selected cryptographic security module, and wherein the global configuration file is digitally signed, by the management program, using a private key with a certificate that has been signed in a correct certificate chain, and wherein the global configuration file is in secure/multipurpose internet mail extensions format for digitally signed documents; and program instructions to transmit, by the management program, a notification to an agent program on a client computer, wherein the notification informs the agent program of the generated global configuration file stored in the database, and wherein the notification directs the agent program to enforce the selected cryptographic security module on the client computer.

14. The computer system of claim 13, wherein selection and identification of the selected cryptographic security module may be passed as a command line argument within a command line interface.

15. The computer system of claim 13, wherein enforcing the selected cryptographic security module comprises:

program instructions to download the generated global configuration file to a local file system on the client computer;

program instructions to validate the generated global configuration file via a trusted certificate chain; and program instructions to load the selected cryptographic security module on the client computer.

16. The computer system of claim 15, wherein program instructions to load the selected cryptographic security module include loading the unique individual symbols that contain references to functions within the selected cryptographic security module.

17. The computer system of claim 13, wherein the notification is implemented via a user datagram protocol message.

* * * * *